Patented Nov. 22, 1949

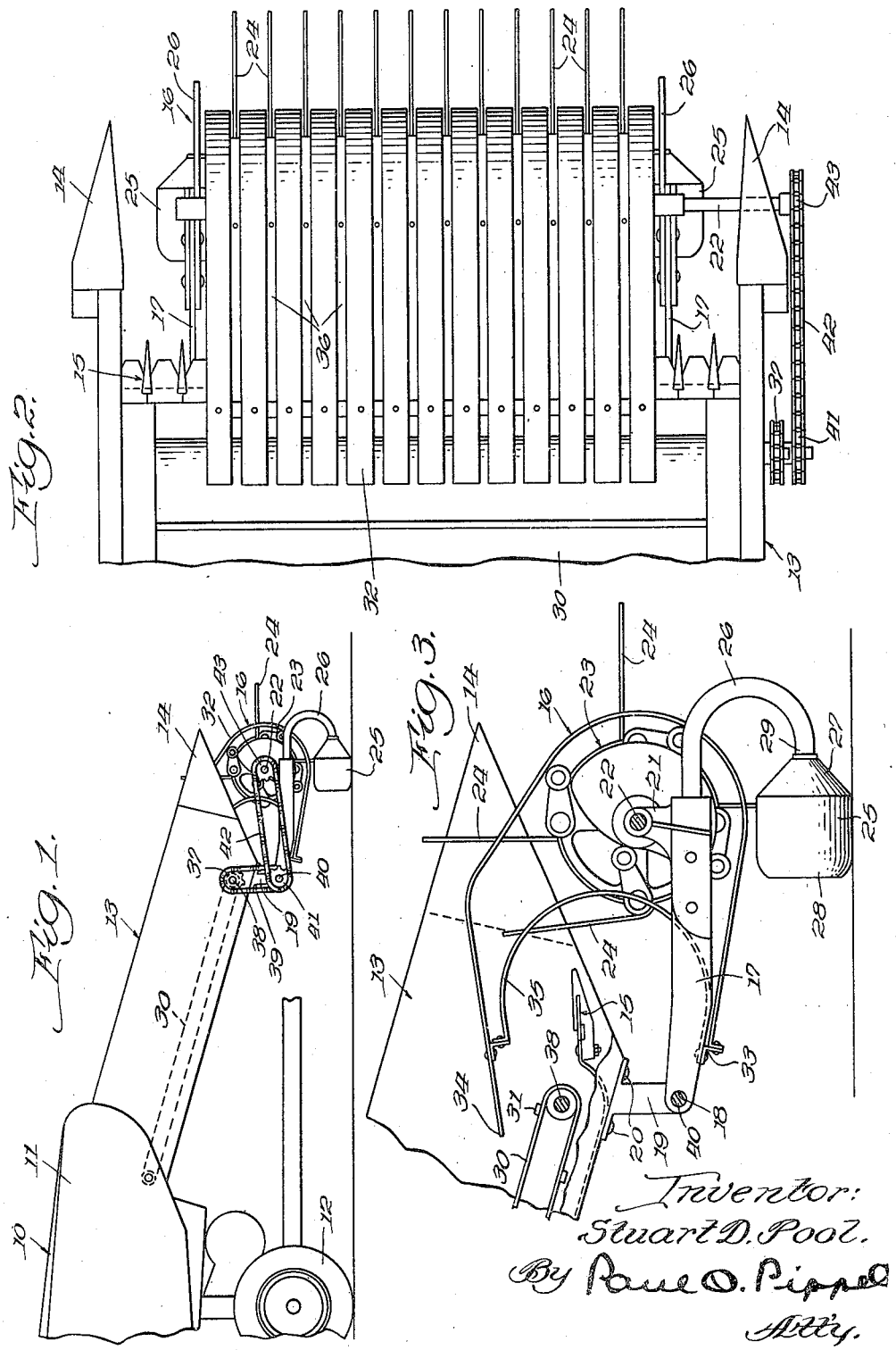

2,488,738

UNITED STATES PATENT OFFICE 2,488,738

FLOATING PICKUP

Stuart D. Pool, Moline, Ill., assignor to International Harvester Company, a corporation of New Jersey Application November 23, 1945, Serial No. 630,298

2 Claims. (Cl. 56—364)

This invention relates to a new and improved floating pick-up for attachment to platforms of farm implements, such as harvester threshers, windrow harvesters, and the like.

The principal object of this invention is to provide a floating pick-up for farm implements which will readily follow the contour of the field over which it is being operated.

Pick-up attachments for harvester threshers are common to the farm implement industry. The harvester threshers are regularly equipped with a platform and a sickle at the forward end thereof for cutting standing grain. These platforms have been undergoing many changes and have now reached a point where they are considerably different in shape in addition to having their operation greatly revamped. Originally, harvester platforms were positioned relatively horizontal with respect to the ground, and adjustments for cutting standing grain higher or lower were made by a hinging movement of the horizontal platform about its rear edge. The hinging axis would therefore lie in a plane relatively close to the ground. The platforms were generally equipped with floating means so that the platform could raise if it struck an obstruction. Pick-up attachments for these older harvesting machines could be rigidly fastened to the low-hinged platform and they would effectively float integrally with the regular platform of the implement without additional floating means for the pick-up attachment.

Platforms on present day harvester threshers are no longer hinged at a point closely adjacent the ground but rather are hinged at a point relatively high on the implement so that the fore end or nose of the platform is inclined forwardly and downwardly for all cutting height adjustments. The platform is more or less like a scoop shovel, and although it is permitted upward floating movement, if the nose of the platform should strike the ground or some obstruction, it would tend to dig in rather than raise as desired. This is not so serious with the use of only the regular platform, but when a pick-up device is attached to the platform, the spring tines or pick-up fingers are apt to be broken much more easily than on the older style harvester platforms.

It is, therefore, an important object of this invention to provide a pick-up attachment for modern harvester platforms wherein the pick-up attachment is provided with its own floating means.

A further important object of this invention is the provision of novel skid means for a floating pick-up in which the skid permits movement of the implement in any direction and especially turning of corners without unduly tearing up the ground.

A still further important object of this invention is to provide ground-engaging roller skid means for a crop pick-up device associated with agricultural implements.

Other and further important objects of this invention will become apparent from the disclosures in the following specification and accompanying drawing, in which:

Figure 1 is a side elevational view of the pick-up attachment of this invention mounted on a present day harvester platform;

Figure 2 is an enlarged top plan view of the floating pick-up of this invention; and Figure 3 is an enlarged end view of the floating pick-up of this invention.

As shown in the drawing, the reference numeral 10 designates generally a harvester thresher having a separator 11 mounted on a wheel support 12 and having a forwardly and downwardly extending platform 13 hinged at the forward end of the separator 11. The platform 13 is of the scoop-shovel type and as best shown in Figure 2 is equipped with forwardly extending gathering points 14 at each side thereof. Intermediate the points 14 and extending entirely across the front of the platform 13 is a sickle 15 normally adapted to cut standing grain.

As shown in Figure 3, the platform 13 has been raised to a level where the sickle 15 is substantially in an inoperative position, although for very tall grain this height adjustment may be feasible. A pick-up device 16 is mounted on the forward end of the platform 13 and takes the place of the sickle 15. Of course, when a pick-up device is used the standing grain has been previously cut by another machine, such as a mower or a windrower, and the sickle is unnecessary.

The pick-up device 16 comprises a pair of frame arms 17 hinged at 18 on a pair of depending arms or the like 19 riveted or otherwise fastened to the underside of the platform 13 at 20. The frame arms are equipped with upwardly extending journal members 21 adapted to support for rotary motion a shaft 22 about which is mounted a cylinder 23 having pick-up tines 24. The pick-up tines 24 are preferably made of spring steel and are mounted on the cylinder 23 by means of a spring attachment, thus providing a resilient mounting for the tines.

Without further apparatus the pick-up tines 24 would drag on the ground. As stated above, pick-up devices have not generally been floated separately on a platform and hence no additional ground-engaging means was necessary. Still other pick-up devices have employed caster wheels to provide a constant space between the pick-up tines and the ground. In the present device, roller-like skids 25 are mounted at each end of the cylinder 23 and on forwardly, downwardly, and rearwardly curved supporting shafts 26 which are fastened at their upper ends to the forward ends of the frame arms 17. These rollers take the place of caster wheels or runner skids and perform the various functions necessary for a pick-up support better than any prior construction. The roller skids 25 are frusto-conical in shape at their forward ends as shown at 27 and annularly curve and inwardly at their rearward ends as shown at 28 so that the implement is permitted forward and rearward movement without jamming of the roller skid into the ground.

The roller 25 is journaled for rotation about a longitudinally horizontally extending axis on a rearward extension 29 of the curved shaft member 26. This rotatable mounting of the roller 25 permits unhindered lateral movement of the implement having the pick-up attachment at the forward end thereof. It will thus be seen that the pick-up device of this invention is simple in construction and yet is conducive to three different movements of the implement—that is, forward, rearward, and lateral. This roller skid construction is relatively simple compared to the complex caster wheel mountings on other devices of this kind and does not tear up the ground when the implement is turned such as a caster wheel does.

As best shown in Figures 1 and 3, the platform 13 is equipped with an upwardly and rearwardly running conveyor 30 having cross slats 31 adapted to elevate material thereon. When the pick-up attachment is attached to the forward end of the platform 13 as shown in all the figures of the drawing, a shield member 32 attached to the underside of the frame arms 17 at 33 extends forwardly and upwardly around the pick-up cylinder 23 and terminates at 34 immediately above the elevating conveyor 30. A reenforcing structure 35 is positioned between the upper and lower portions of the shield 32 to maintain the shield in a somewhat rigid position. As best shown in Figure 2, the shield 32 is equipped with a plurality of slots 36 to permit the pick-up tines 24 to pass therethrough. In operation, the tines 24 pick hay or straw from a windrow and throw it up over the top of the shield 32 where it is deposited on the upwardly and rearwardly running conveyor 30.

The drive for the pick-up cylinder is taken from the conveyor 30 as best shown in Figure 1 wherein a sprocket 37, mounted on the lower shaft 38 of the conveyor 30, supports a chain 39 adapted to cause rotation of a shaft 40 by means of a sprocket (not shown). A sprocket 41 is fastened to the shaft 40 and carries a chain 42 adapted to drive a sprocket 43 on the cylinder shaft 22.

Numerous details of construction may be varied throughout a wide range without departing from the principles disclosed herein, and I therefore do not propose limiting the patent granted hereon otherwise than as necessitated by the appended claims.

What is claimed is:

1. A pick-up for attachment to platform extending across the front of farm implement having a front and rear comprising a cylinder having raking tines positioned substantially parallel to and spaced forwardly of said platform, arms journally supporting the ends of said cylinder and hingedly attached at their rear ends to the implement platform, ground-engaging skid means for said pick-up cylinder, said skid means including forwardly, downwardly and rearwardly extending portions of a fixed arm at each end of the pick-up cylinder, said rearwardly extending portion of the arm disposed longitudinally and substantially horizontally, and a longitudinally extending roller journally mounted on the rearwardly extending portion of each of said arms, said rollers having their forward ends annularly tapered inwardly and their rearward ends annularly curved inwardly whereby the rollers act as skids during forward and rearward movement of the implement and as wheels during lateral movement of said implement.

2. In combination with a transversely extending harvester platform having a front side, a frame hingedly mounted on said harvester platform, a pick-up device mounted on said frame to gather crop material from the ground and load it onto the platform, and a ground support for the hinged frame comprising an arm fixed to said frame and extending forwardly, thence downwardly and rearwardly in a generally longitudinal direction and being substantially horizontally disposed, and a longitudinally extending roller-like skid turnable about the rearwardly extending part of the arm as an axis substantially parallel with the line of draft, said roller having its front end frusto-conical in shape and its rear end annularly curved inwardly whereby the roller is diminished in size at its forward and rearward ends and acts as a skid without rotation in a fore and aft direction and as a wheel for lateral movement to cause quick and easy vertical adjustment of the frame and pick-up device about its hinge attachment to the harvester platform upon deviations in ground levels.

STUART D. POOL.

REFERENCES CITED

The following references are of record in the file of this patent:

UNITED STATES PATENTS

| Number | Name | Date |
|---|---|---|
| 581,216 | Merl | Apr. 20, 1897 |
| 1,896,626 | Innes | Feb. 7, 1933 |
| 2,284,777 | Sund | June 2, 1942 |